W. D. JONES.
VEHICLE LOCK.
APPLICATION FILED OCT. 21, 1915.

1,199,559.

Patented Sept. 26, 1916.

WITNESS
Chas. F. Clagett

INVENTOR
William D. Jones
BY
HIS ATTORNEYS

United States Patent Office.

WILLIAM D. JONES, OF NEW YORK, N. Y., ASSIGNOR OF ONE-HALF TO ISAAC N. WILLIAMS, OF NEW YORK, N. Y., AND ONE-HALF TO THOMAS K. STEWART, OF BROOKLYN, NEW YORK.

VEHICLE-LOCK.

1,199,559.

Specification of Letters Patent. Patented Sept. 26, 1916.

Application filed October 21, 1915. Serial No. 57,168.

*To all whom it may concern:*

Be it known that I, WILLIAM D. JONES, a citizen of the United States, residing in the borough of Manhattan, city, county, and State of New York, have invented an Improvement in Vehicle-Locks, of which the following is a specification.

As is generally known, it is quite common, particularly in cases where the owner drives his own motor car, to leave the vehicle against the curb or on the side of the road for greater or less periods and often for hours or more at a time. This makes it possible for unscrupulous persons to steal unattended motor cars either by driving off in them or towing them away, both methods being employed with greater frequency than is commonly appreciated.

I am aware that various devices have been employed to render the motor car driving mechanism inoperative so that the cars cannot be driven away by thieves. This, however, does not prevent the car being towed away by another vehicle. On November 2, 1915, Letters Patent No. 1,159,041, were granted to John G. Grimley and myself jointly for a device for locking the steering gear of a motor car with the steering wheels in their extreme angular position or in such a position that the running wheels are not in their direct line of travel. In the use of this device with the running wheels locked in this position, the vehicle can be made to travel or run only in a circular path and consequently cannot be driven or towed away. In this device, however, the locking mechanism employed was associated with the axle of one of the running wheels and adapted to coöperate with the hub of the running wheel. This, it will be appreciated, makes the device more or less inaccessible and inconvenient to operate.

My present invention relates to the same general character of a lock, that is to say, one in which the running wheels are maintained either in their extreme angular position or out of line with the direct line of travel and in carrying out the same I prefer to employ a lever adapted in one position to engage the rim of a running wheel, a lock for maintaining the lever in both its operative and inoperative positions, as well as means operated at the dash board for swinging the lever to and from its operative and inoperative positions, as will be hereinafter more particularly described.

Figure 1:
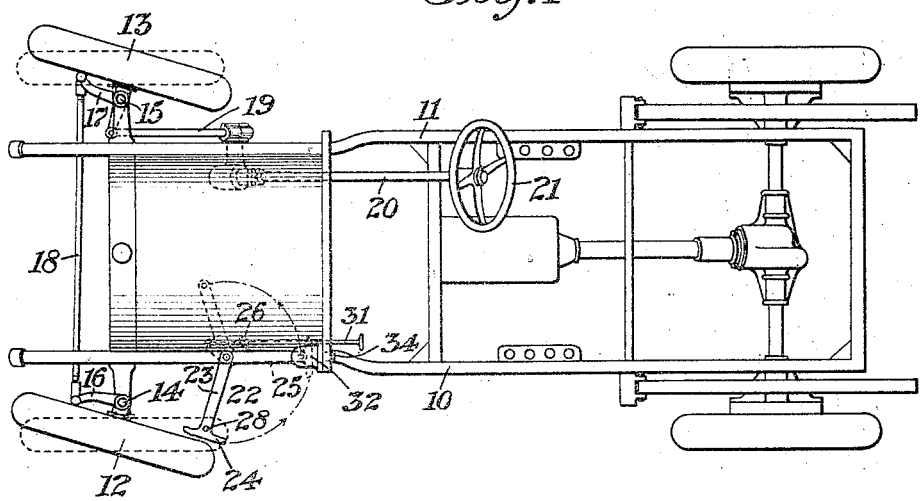
Figure 2:
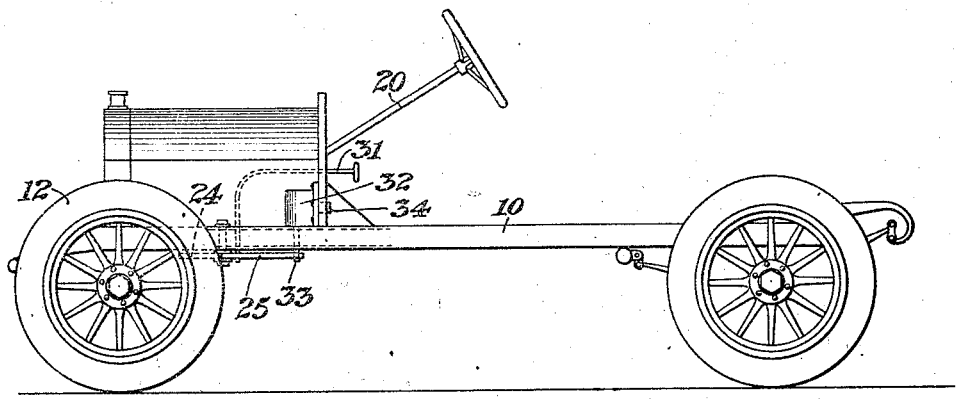
Figure 3:
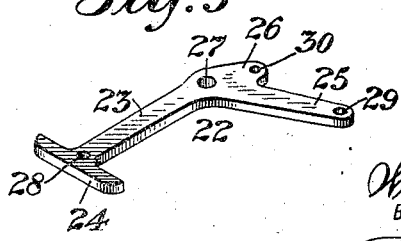

In the drawing: Figure 1, is a diagrammatic plan of the chassis or frame of the motor car illustrating the steering mechanism and the lock devices comprising my present invention. Fig. 2, is a side elevation of the same, and Fig. 3, is a perspective view of the lever comprising part of my improved locking device.

Referring to the drawing, the side or longitudinal members of the chassis or frame of the motor vehicle are indicated at 10 and 11. The front running wheels of the vehicle are illustrated at 12 and 13. These steering wheels as is customary are mounted on axles, which are pivotally connected to the frame as indicated at 14 and 15. Also as is customary, the lever arms 16 and 17 are connected to the wheel axles and with each other by a tie-rod 18, so that the wheels are caused to turn in unison. On one side of the mechanism a steering gear connecting rod 19 is connected at one end of a lever arm secured to the axle on which the wheel 13 is mounted and at its opposite end to a frame which is moved forwardly and backwardly through a suitable gear by a steering rod which passes through the column 20 and carries the usual steering wheel 21 at its upper end.

As will be understood the hereinbefore described steering mechanism is only illustrative of the parts described, inasmuch as any steering mechanism may be employed in the use of my invention.

The lock mechanism I now prefer to employ comprises a bell crank lever 22 having a stop arm 23 at one end of which is a head 24 adapted when the lever is in its operative position to engage the rim of one of the running wheels of the vehicle and a lock arm 25 adapted as hereinafter described to be fixed so as to maintain the stop arm in its operative position. This bell crank lever adjacent its pivoted point is also provided with a lug 26.

The bell crank lever 22 is provided with a pivot aperture 27 through which a suitable pin or other member upon which the bell crank lever may turn is placed and secured in position in one of the side or lever members of the chassis or frame of the vehicle. Adjacent the end of the stop arm 23 there is a bolt hole 28 and adjacent the end of the lock arm 25 there is a bolt hole 29. The lug 26 is also provided with an aperture 30 through which one end of an operating rod 31 is placed and secured so that from the opposite end of this rod which preferably passes through the dash board of the car, the lever may be swung from its operative to its inoperative position and vice versa.

I also employ a lock which is indicated at 32 and is shown as secured to the dash board by bolts but which may be fixed by any other suitable means. The bolt of the lock is indicated by 33 and the key for operating the lock by 34. It is to be understood, however, that any suitable form of a lock may be employed in the use of this invention.

As illustrated in Figs. 1 and 2, the lock mechanism is shown in its operative position in which the head or end of the stop arm 23 is adapted to engage the rim of the running wheel 12. In this position the bolt 33 of the lock passes through the bolt hole 29 in the lock arm of the lever in order to maintain the stop arm in its operative position. Also as shown in these figures of the drawing, when the bolt of the lock is thrown, the rod 31 may be pushed forwardly until the head or end thereof contacts with the dash board to swing the lever to its inoperative position, as is illustrated in dotted lines, and in which the bolt of the lock may be thrown again to enter the hole 28 in the stop arm of the lever so as to maintain the same in its inoperative position in which it will be understood it does not in any manner interfere with the operation of the steering gear of the vehicle.

While I have herein shown and described my invention as particularly applicable to a motor vehicle it will be understood that the same may be applied with equal facility and the same advantages to any four wheeled vehicle.

I claim as my invention—

1. In a vehicle wheel and in combination with the running wheel, a device for laterally contacting with the rim of said running wheel for holding the wheel in a deflected position without preventing the same from turning upon its axis, and means for operating said device from the driver's seat in the vehicle.

2. In a vehicle and in combination with a running wheel, a device for laterally contacting with the rim of the running wheel for holding the wheel in a deflected position without preventing the wheel from turning upon its axis, means for operating the said device from the driver's seat in the vehicle, and means also operative from the driver's seat for locking said device in engagement with said wheel.

3. In a vehicle and in combination with a running wheel, a lever pivotally mounted in the frame of the vehicle and adapted at the end of one arm thereof to contact laterally with the rim of the running wheel to hold the wheel in a deflected position without preventing the wheel turning upon its axis, and means for engaging the other arm of the said lever to lock the same in engagement with said wheel.

4. In a vehicle and in combination with a running wheel, a lever pivotally mounted in the frame of the vehicle and adapted at the end of one arm thereof to contact laterally with the rim of the running wheel to hold the wheel in a deflected position without preventing the wheel turning upon its axis, and means for engaging the ends of the arms of the said lever for locking the same in engagement with said wheel and also when not in engagement therewith.

5. In a vehicle and in combination with a running wheel, a lever pivotally mounted in the vehicle frame and adapted at the end of one arm thereof to contact with the rim of the running wheel to hold the same in a deflected position without preventing the wheel turning upon its axis, means for actuating said lever from the driver's seat in the vehicle, and means for engaging the end of the other arm of the lever to lock the same in engagement with the wheel.

6. In a vehicle and in combination with a running wheel, a lever pivotally mounted in the vehicle frame and adapted at the end of one arm thereof to contact with the rim of the running wheel to hold the same in a deflected position without preventing the wheel turning upon its axis, means for actuating said lever from the driver's seat in the vehicle, and means also operative from the driver's seat for engaging the ends of the arms of said lever for locking the same in engagement with said wheel and also when out of engagement therewith.

7. In a vehicle and in combination with the running wheel, a lever pivotally mounted in the frame of the vehicle and adapted at the end of one arm thereof to contact with the rim of the running wheel to hold the wheel in a deflected position without preventing the wheel from turning upon its axis, a lug on said lever adjacent its pivoted point, and a connection from the said lug extending to and through the dash board of the vehicle to be operated from the driver's seat for swinging the said lever into and out of engagement with said wheel.

8. In a vehicle and in combination with the running wheel, a lever pivotally mounted in the frame of the vehicle and adapted at the end of one arm thereof to contact with the rim of the running wheel to hold the wheel in a deflected position, without preventing the wheel from turning upon its axis, a lug on said lever adjacent its pivoted point, a connection from the said lug extending to and through the dash board of the vehicle to be operated from the driver's seat for swinging the said lever into and out of engagement with said wheel, and means for locking the said lever in engagement with said wheel.

9. In a vehicle and in combination with the running wheel, a lever pivotally mounted in the frame of the vehicle and adapted at the end of one arm thereof to contact with the rim of the running wheel to hold the wheel in a deflected position, without preventing the wheel from turning upon its axis, a lug on said lever adjacent its pivoted point, a connection from the said lug extending to and through the dash board of the vehicle to be operated from the driver's seat for swinging the said lever into and out of engagement with said wheel, and a bolt operative also from the driver's seat for engaging the other end of said lever to lock the same in engagement with said wheel and for engaging the contact end of the said lever for locking the same when out of engagement with said wheel.

Signed by me this 19th day of October, 1915.

WILLIAM D. JONES.